United States Patent
Pohjanvouri et al.

(10) Patent No.: US 10,674,677 B2
(45) Date of Patent: Jun. 9, 2020

(54) METHOD FOR CONTROLLING GROWTH OF A PLANT

(71) Applicant: HELIOSPECTRA AB, Göteborg (SE)

(72) Inventors: Timo Pohjanvouri, Hovås (SE); Richard Rebhan, Stockholm (SE); Staffan Hillberg, Mölndal (SE); Kirk Clendinning, Jörlanda (SE)

(73) Assignee: HELIOSPECTRA AB, Gothenburg (SE)

( * ) Notice: Subject to any disclaimer, the term of this patent is extended or adjusted under 35 U.S.C. 154(b) by 549 days.

(21) Appl. No.: 14/902,298

(22) PCT Filed: Jul. 9, 2014

(86) PCT No.: PCT/EP2014/064705
§ 371 (c)(1),
(2) Date: Dec. 30, 2015

(87) PCT Pub. No.: WO2015/004179
PCT Pub. Date: Jan. 15, 2015

(65) Prior Publication Data
US 2016/0366833 A1 Dec. 22, 2016

(30) Foreign Application Priority Data
Jul. 10, 2013 (EP) .................. 13175852

(51) Int. Cl.
*A01G 7/04* (2006.01)
*A01G 22/00* (2018.01)
(Continued)

(52) U.S. Cl.
CPC .............. *A01G 7/045* (2013.01); *A01G 9/20* (2013.01); *A01G 22/00* (2018.02); *G05B 15/02* (2013.01); *Y02P 60/146* (2015.11)

(58) Field of Classification Search
CPC .......... A01G 7/045; A01G 1/001; A01G 9/20
(Continued)

(56) References Cited

U.S. PATENT DOCUMENTS 4,627,202 A * 12/1986 Esposito ................. A01G 9/227
52/209
5,818,734 A * 10/1998 Albright ................... A01G 9/26
47/17

(Continued)

FOREIGN PATENT DOCUMENTS

| EP | 2 710 883 A1 | 3/2014 |
|---|---|---|
| JP | 2005-013056 A | 1/2005 |

(Continued)

OTHER PUBLICATIONS

International Search Report (PCT/ISA/210) dated Sep. 30, 2014, by the European Patent Office as the International Searching Authority for International Application No. PCT/EP2014/064705.

(Continued)

*Primary Examiner* — Ebony E Evans
(74) *Attorney, Agent, or Firm* — Buchanan Ingersoll & Rooney P.C.

(57) ABSTRACT

The present invention relates to a method for controlling the growth of a plant, the plant being of a predetermined type and arranged in a controlled environment subject to receiving illumination of a mixture of natural and artificial light. The invention also relates to a corresponding system for controlling the growth of a plant and to a computer program product.

14 Claims, 4 Drawing Sheets

(51) Int. Cl.
  *A01G 9/20* (2006.01)
  *G05B 15/02* (2006.01)
(58) Field of Classification Search
  USPC .......................................................... 47/58.1
  See application file for complete search history.

(56) References Cited

U.S. PATENT DOCUMENTS

| | | |
|---|---|---|
| 2014/0173769 A1 | 6/2014 | Leyns et al. |
| 2015/0230409 A1* | 8/2015 | Nicole .................. A01G 7/045 47/17 |
| 2017/0135288 A1* | 5/2017 | Krijn ........................ A01G 9/26 |
| 2017/0181252 A1* | 6/2017 | Wouhaybi .......... H05B 37/0245 |
| 2017/0257925 A1* | 9/2017 | Forbis ................ H05B 33/0872 |
| 2017/0339839 A1* | 11/2017 | Carstensen ............ A01G 7/045 |

FOREIGN PATENT DOCUMENTS

| | | |
|---|---|---|
| JP | 2012217352 A | 11/2012 |
| WO | WO 2008/118080 A1 | 10/2008 |
| WO | WO 2012/101546 A1 | 8/2012 |
| WO | WO 2013/027198 A1 | 2/2013 |

OTHER PUBLICATIONS

Written Opinion (PCT/ISA/237) dated Sep. 30, 2014, by the European Patent Office as the International Searching Authority for International Application No. PCT/EP2014/064705.

Office Action (Notice of Reasons of Reasons for Refusal) dated Jun. 5, 2018, by the Japanese Patent Office in corresponding Japanese Patent Application No. 2016-524807, and an English Translation of the Office Action. (6 pages).

* cited by examiner

METHOD FOR CONTROLLING GROWTH OF A PLANT

TECHNICAL FIELD

The present invention relates to a method for controlling the growth of a plant, the plant being of a predetermined type and arranged in a controlled environment subject to receiving illumination of natural light. The invention also relates to a corresponding system for controlling the growth of a plant and to a computer program product. The invention allows for improvements in operating a greenhouse, such as in relation to reduced energy consumption, improved planning of work-flow and increased predictability of the growth process.

BACKGROUND OF THE INVENTION

Typical greenhouse growth of plants makes use of the natural energy provided by the sun. However, in some cases, for example depending on the geographical location of the greenhouse, the amount of light and/or heat must be adjusted for controlling the growth of the plants growing inside of the greenhouse, using for example heating/ventilation systems as well as artificial and supplemental lighting for increasing the quantity of light provided to the plants and light absorbent curtains for reducing the quantity of natural light provided to the plants.

Artificial and supplemental lighting in a greenhouse typically involves use of an illumination system for stimulating plant growth, possibly even improving the growth process in comparison to the sole use of natural light. Such an illumination system typically comprising a plurality of high power light sources. Different types of light sources, having different light spectrum and providing different effects on growth stimulation, may be included, such as light sources based on metal halide (MH) or high intensity discharge (HID) which includes high pressure sodium (HPS). Using metal halide based lighting typically promotes shorter, bushy growth; whereas high pressure sodium based lighting in comparison typically tend to produce taller and stretched plants.

Recently, much progress has been made in increasing the brightness of light emitting diodes (LEDs). As a result, LEDs have become sufficiently bright and inexpensive to serve also for artificial lighting in e.g. a greenhouse environment, additionally providing the possibility of emitting light with adjustable color (light spectrum). By mixing differently colored LEDs any number of colors can be generated. An adjustable color lighting system typically comprises a number of primary colors, for one example the three primaries red, green and blue. The color of the generated light is determined by the LEDs that are used, as well as by the mixing ratios. By using LEDs it is possible to decrease the energy consumption, a requirement that is well in line with the current environmental trend. Additionally, using LED based illumination system minimizes the amount of light source generated heat which is specifically suitable in an environment where temperature control is desirable.

An example of an LED based illumination system is disclosed in WO2008118080, comprising a light sensor communicatively coupled to a processor, where the processor implements a control algorithm for modulating and improving plant growth and attributes by adjusting the light emitted by the LEDs.

WO2008118080 shows a promising approach in relation to artificial lighting in a greenhouse environment providing the possibility to introduce plant specific light regimes, however, it would still be desirable to further optimize the artificial and/or supplemental light emitted by an illumination system, to be able to improve the predictability of the overall growth process of a plant including when and where to control of the amount of light to be received by the plants to achieve a desired end result, specifically taking into account the total energy consumption for growing the plant and possibility to plan the work-flow for harvesting the plants.

SUMMARY OF THE INVENTION

According to a first aspect of the invention, the above is at least partly alleviated by a method for controlling the growth of a plant, the plant being of a predetermined type and arranged in a controlled environment subject to receiving illumination of at least natural light, the method comprising acquiring a desired completion state for the plant, the desired completion state defining an end of a planned growth period for the plant, acquiring a forecast of at least one environmental parameter outside of the controlled environment, the at least one environmental parameter comprising an expected quantity of natural light to illuminate the plant during at least a portion of the planned growth period, and determining a light adjustment quantity as a function of the expected quantity of natural light and a total quantity of light to illuminate the plant during the planned growth period, wherein the total quantity of light is determined based on the type of the plant.

By means of the invention, it may be possible to control the quantity light being received by a plant during a planned growth period, the quantity of light being dependent on the type of plant and a forecast of an environmental condition including at least an expected quantity of natural light. Accordingly, a growth process for the plant may be controlled such that the plant is at a desired completion state only once the planned growth period has been completed. Advantages following such a control functionality, where an environmental forecast is taken into account, includes for example the possibility to apply a "just-in-time" methodology for growing the plants, where the plant may be targeted for reaching a specific growth state for example suitable for transportation to an end consumer, grocery store, factory or similar. Accordingly, the desired completion state may in some implementations of the invention be directly related to a "just-in-time delivery date" for the plants. As such, a desired end result in relation to when the plant is "leaving the controlled environment" may be achieved.

At the same time, as the environmental forecast is taken into account the plants may be grown such that an optimal amount of natural light is received by the plants, thereby possibly minimizing the energy consumption for growing the plants. Furthermore, the use of natural resources may be increased at the same time as an improved control of when a plant is "ready" may be achieved. It should be stressed that according to the invention the light adjustment quantity may range from a negative value to a positive value, i.e. indicating that either a further quantity of light or a lesser quantity of light is needed for achieving the total quantity of light to illuminate the plant during the planned growth period. In regards to the total quantity of light to illuminate the plant during the planned growth period, this term is typically defined as including the total quantity of light to have reached the plant at the end of the growth cycle, being a minimum instant quantity of light for slowing the growth without negative impact on the characteristics of the plant to an end consumer, further taking into account a maximum instant quantity of light for maximum growth without stressing the plant. Different processes for growing a plant may according to the invention be defined as different "growth regimes". Such a growth regime may for example define a growth process for "slow growth" of a plant, as well as for "fast growth" of a plant. Still further regimes may be defined/applied, including growth regimes for growing "bushy" plants, plants with a lot of flowers, etc.

In accordance to the invention, the expression "controlled environment" should be interpreted broadly, including for example a greenhouse, a growing cabinet, or similar controlled growth environment where the plants may be subject to at least illumination of natural light. The controlled environment is thus typically an "indoor environment" comprising a transparent window or similar for allowing the natural light (such as sun) to be received by the plants. Furthermore, it should be understood that a greenhouse is defined as a facility holding at least one production line for growing one or a plurality of plants, however, the term may also refer to a cluster of greenhouses with multiple production lines. Similarly, the term "a desired completion state for the plant" should be understood to include e.g. a suitable harvest date for the plants, but also including (as mentioned above) a growth state for the plants suitable to fit into a logistic chain in order to e.g. provide optimum fresh plants to the end consumer to minimum waste.

Furthermore, the expression "predetermined type of plant" typically relates to any single type of plant or being a mixture of more than one type of plant having similar or combinable growth characteristics, i.e. needing a similar quantity of light for reaching a desired growth state. For reaching the desired growth state in the planned growth period, a plant being of a specific type is of course subject to further factors influencing the growth, including for example an amount of fertilizers as well as greenhouse $CO_2$ concentrations (in case the plant grows according to a normal procedure).

To exemplify, a plant has been placed in the controlled environment with the purpose of growing the plant and having a desired delivery date. To be able to plan the desired delivery date provides the means to plan the logistics beforehand and also optimize the greenhouse workforce required to harvest the plants by not having too many growths with the same delivery date. The weather forecast during a first growth period is expected to be rainy. Then, it is forecasted a second (following after the first period) period to be sunny with very good growing conditions. The optimization according to the present invention starts then at the desired delivery date, applying the sunny weather during period (backward in time) with little or no artificial light. The growth needs therefore be at a specific point (specific growth state) at the end of the first period. To reach the specific growth state at the completion of the first period, a calculated amount of light has to be applied during this first period. It should be noted that the plant would have overgrown at deliver date if excess of light was applied during the first period. The proposed scheduling of additionally applied light was accordingly optimized in regards to energy conservation.

In a preferred embodiment of the invention, the method further comprises determining a distribution schedule for the light adjustment quantity to be provided during the planned growth period as a function of the expected quantity of natural light. The distribution schedule is typically determined over time during the days of the planned growth period (anytime within the 24 hours of the day could be considered), including possible fluctuations occurring during the different hours of the day (e.g. sunny between 08 am-11 am, cloudy between 11 am-2 pm, sunny again between 2 pm-6 pm). In determining the distribution schedule is may additionally be possible to take into account the statistical reliability of the environmental forecast, thereby improving the reliability of reaching the desired growth state once the planned growth period is completed.

Preferably, the total quantity of light to illuminate the plant during the planned growth period is further determined based on at least one of a growth state of the plant and an environmental parameter inside of the controlled environment. The (e.g. present) growth state of the plant may for example be determined from sensor data collected from sensors arranged in the vicinity of the plants and configured to monitor different characteristics of the plants (type of light reflected from the plants, chlorophyll fluorescence, plant/leaf temperature, etc.). Possible environmental parameters inside of the controlled environment includes, among others, temperature, $CO_2$ levels, fertilizer used/levels, etc., as well as information concerning building latency (time/curve for heating heating/cooling of the controlled environment).

Typically, it may be advantageous to re-calculate the total quantity of light at least once during the planned growth period. That is, in case it has been determined that the growth state of the plants, at some point in time during the planned growth period, somewhat differs from an expected state at that time, it may be necessary to re-calculate the total quantity of light. This re-calculation may be automatically initiated for example based on sensor data collected inside of the controlled environment, or user initiated once a user has on site reviewed and determined a current/present growth state.

In an embodiment, adjusting the quantity of light (i.e. to provide the light adjustment quantity) is achieved by using at least one of an artificial light source or means for reducing the quantity of natural light. An artificial light source (or an artificial lighting arrangement comprising a plurality of controllable light sources) may include for example an LED light source (or sources). Other types of artificial light sources includes for example light sources based on metal halide (MH) technology, incandescent light sources, fluorescent light sources, high-pressure sodium (HPS) light sources, or a combination thereof. Similarly, in reducing the quantity of natural light being received by the plants, different types of light screening technologies may be used, including for example light absorbent curtains. In relation to the above discussed distribution schedule, it should be noted that it may be possible to, once an artificial light source is used, to take into account e.g. charging and price methodology used by a power company in the distribution of electrical energy for optimizing the distribution schedule for minimizing the cost of energy during planned growth period when driving the artificial light source.

In addition, it may according to the invention be possible to adjust the desired completion state, specifically in relation to the planned growth period. As improved control of the growth process may be achieved using the artificial lighting arrangement, also "different ways" of growing the plants may be possible. Accordingly, in case a request is made to complete the growth process in a shorter (or longer) time (e.g. due to a changed demand), a different regime for growing the plants may be implemented, where the plants thus may be grown in a faster (or slower) manner.

Selecting a different growth regime may also be desired in case of an unexpected change in weather condition, where the new growth regime is selected depending on a e.g. new desire or possibility arising due to the changed weather condition. Similarly, in case of a somewhat negatively changing weather condition (i.e. minimal amount of natural sun to be expected), the growth regime may be selected to push forward plants where e.g. a desired "quality level" of the grown plants may be achieved. Further possibilities in adapting a specified end result "along the way" for example depending of changing desires or weather conditions may be possible (e.g. in relation to but not limited to height of the plants, "bushiness", number of flowers, smell/taste, etc.) and is well within the scope of the invention. At the same time, in case of a plurality of related greenhouses being controlled using the same inventive concept, it may be possible to make different adjustments for different greenhouses to accomplish a desired "total end result" for all of the greenhouses (taken into account logistical considerations, workforce planning, peak as well as mean energy consumption, etc.).

Preferably, the forecast of at least one environmental parameter outside of the controlled environment further comprises information of an expected temperature fluctuation during at least a portion of the planned growth period. Accordingly, in such an embodiment is not only the fluctuation of natural light to be expected taken into account, but also a time-based fluctuation of the outside temperature. As such, it may be possible to also control the temperature inside of the controlled environment based on the temperature to be expected outside of the controlled environment. As discussed above, e.g. building latency, charging and price methodology, statistical reliability of the environmental forecast in regards to the temperature may be taken into account for further improving and optimizing the growth of the plant in regards to e.g. the discussed just-in-time methodology and/or for improving the cost of growing the plants.

Thus, it may in a similar manner as discussed above be possible to determine an adjustment schedule of a temperature inside of the controlled environment based on the expected temperature fluctuation during at least a portion of the planned growth period and a desired temperature fluctuation during the planned growth period.

In a further embodiment of the invention, the determination of the distribution schedule is based on at least one of a cost of energy for controlling the quantity of light received by the plant, a level of energy consumption for the controlled environment, and a peak energy consumption of the controlled environment. As will be discussed below, it may be possible to make further considerations when determining a distribution schedule for adjusting the quantity of light being received by the plant, including for example cost of energy for e.g. providing an additional amount of artificial light. The concept is of course applicable in relation to controlling the temperature within the controlled environment.

Similarly, the determination of the distribution schedule may additionally or alternatively be based a current growth regime applied to the plants growing within the controlled environment. The concept of applying different growth regimes for growing the plants has been discussed above and will be further elaborated below in relation to the detailed description of the invention.

According to another aspect of the present invention there is provided a system for system for controlling the growth of a plant, the plant being of a predetermined type and arranged in a controlled environment subject to receiving illumination of at least natural and artificial light, wherein the system comprises control unit configured for acquiring a desired completion state for the plant, the desired completion state defining an end of a planned growth period for the plant, acquiring a forecast of at least one environmental parameter outside of the controlled environment, the at least one environmental parameter comprising an expected quantity of natural light to illuminate the plant during at least a portion of the planned growth period, and determining a light adjustment quantity as a function of the expected quantity of natural light and a total quantity of light to illuminate the plant during the planned growth period, wherein the total quantity of light is determined based on the type of the plant. This aspect of the invention provides similar advantages as discussed above in relation to the previous aspect of the invention.

According to a further aspect of the present invention, there is provided a computer program product comprising a computer readable medium having stored thereon computer program means for a system comprising a control unit adapted for controlling growth of a plant, the plant being of a predetermined type and arranged in a controlled environment subject to receiving illumination of a mixture of natural and artificial light, wherein the computer program product comprises code for acquiring a desired completion state for the plant, the desired completion state defining an end of a planned growth period for the plant, code for acquiring a forecast of at least one environmental parameter outside of the controlled environment, the at least one environmental parameter comprising an expected quantity of natural light to illuminate the plant during at least a portion of the planned growth period, and code for determining a light adjustment quantity as a function of the expected quantity of natural light and a total quantity of light to illuminate the plant during the planned growth period, wherein the total quantity of light is determined based on the type of the plant. Also this aspect of the invention provides similar advantages as discussed above in relation to the previous aspects of the invention.

The control unit is preferably a micro processor or any other type of computing device. Similarly, the computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
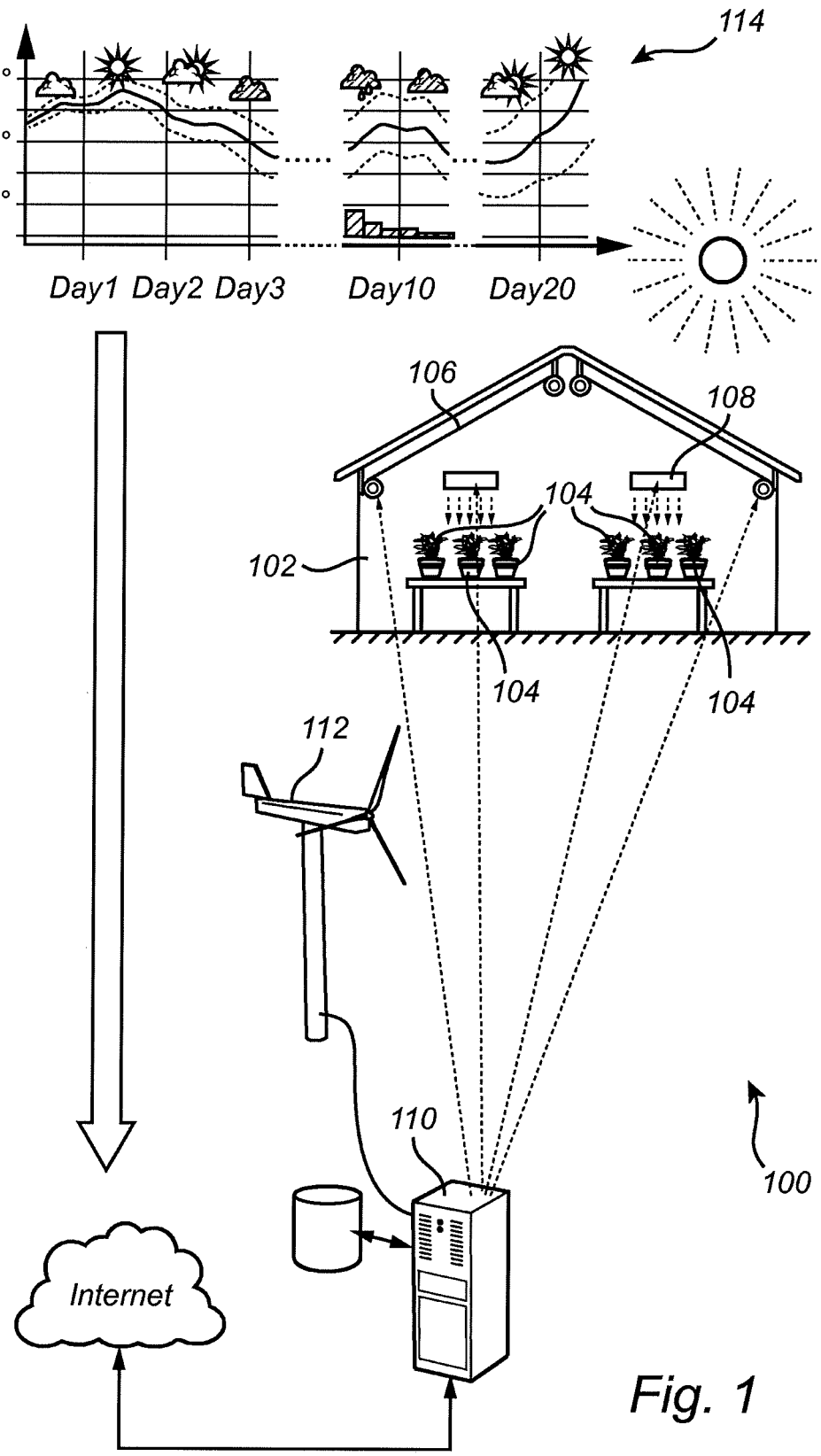
FIG. 1 shows a system according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a system 100 according to a conceptual implementation of the invention. The system 100 comprises a controlled environment, in the illustrated embodiment being a greenhouse 102. The controlled environment could of course be one of a walk-in chamber or a growth cabinet depending on the type of implementation of the inventive concept. Within the greenhouse 102, typically having walls and its roof constructed of transparent structures such as of glass and/or some suitable plastic material for allowing natural light from the sun to enter the inside of the greenhouse 102, there is arranged a plurality of plants 104, for example including herbs, medicinal plants, ornamental and general crops, etc.

In conjunction with the greenhouse 102, there is additionally arranges means for reducing the quantity of natural light as well as means for increasing the quantity of light. In FIG. 1, the light reduction is provided by controllable light absorbent curtains 106 arranged in the roof of the greenhouse 102. Similarly, for increasing the quantity of light, there is in conjunction with the greenhouse 102 provided one or a plurality of controllable artificial lighting arrangements 108. A possible implementation of such an artificial lighting arrangement 108 is further discussed below in relation to FIG. 4.

The light absorbent curtains 106 as well as the artificial lighting arrangements 108 are connected to and controlled by a control unit 110 configured for performing the operational procedures according to the invention. The control unit 110 may be arranged together with the greenhouse 102, or located remotely away from the greenhouse 102 (e.g. using a cloud service).

The control unit 110 may be analogue or time discrete, include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein. A similar functionality as is provided by means of the digital control unit may of course be achieved using analogue and/or a combination of electronic circuitry.

The control unit 110 may further be connected to a locally arranged device for providing a forecast of at least one environmental parameter outside of the greenhouse 102. Such a locally arranged device may for example be a local weather station 112 as shown in FIG. 1. The control unit 110 may alternatively or also be connected to a remote forecasting service 114, including for example services providing detailed meteograms relating to a forecasted environmental condition at the geographical location of the greenhouse 102 (i.e. outside of the greenhouse 102). Such a meteogram may for example include information relating to a forecasted presence of the sun (sunny/cloudy), air temperature, dew point, wind speed and direction, humidity, air pressure, etc.

Even though it is not illustrated in FIG. 1, there may according to the invention be possible to introduce a plurality of sensors arranged inside of the greenhouse 102. Such sensors may for example be configured to determine one or a plurality of environmental parameters inside of the greenhouse 102, as well as for determining a present/current growth state of the plants. The sensors may for example includes sensors for measuring air/soil temperature, air pressure, fertilizer levels, and/or image capturing devices (e.g. cameras) to be used for determining a growth state for the plant 104. Other sensors and similar information capturing devices may of course be included, such as for example sensors for measuring a current power consumption (e.g. a power meter) within the greenhouse 102 or in multiple greenhouses. In addition, the greenhouse 102 may comprise controllable heating elements (not shown) as well as windows (and similar controllable ventilation arrangements) (not shown) connected to the control unit 110 for controlling the temperature within the greenhouse 102, also being dependent on a desired temperature fluctuation for the plant 104 during its growth process.

During operation of the system 100, with further reference to FIGS. 2a-2c and 3, a desired completion state 200 for the plant 104 is acquired, S1, where the desired completion state will define an end of a planned growth period for the plant 104. That is, the desired completion state of the plant 104 is not only dependent on an actual state of the plant 104, such as development, height, number of flowers, color, etc of the plant 104 but will also be dependent on a desired "completion time". As discussed above, this will allow the plant 104 to have reached a specific condition at a specific e.g. date (in the future from when growth process for growing the plant 104 was first imitated).

Once the desired completion state has been acquired, a forecast of at least one environmental parameter outside of the controlled environment is also acquired, S2, the at least one environmental parameter comprising an expected quantity of natural light (e.g. sun light) to illuminate the plant 104 during at least a portion of the planned growth period, i.e. between the initiation of the growth process and the time when it is desired that the plant 104 has reached the desired condition (as discussed above). This forecast will, as discussed above, be acquired from at least one or both of the local weather station 112 or the remote forecasting service 114.

Figure 2A:
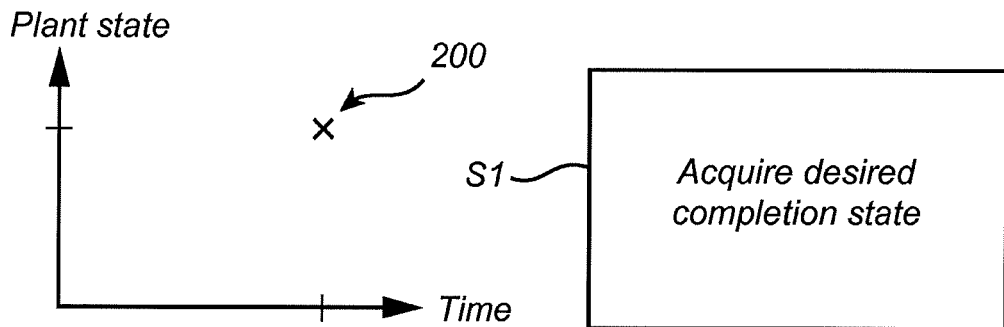
FIGS. 2a-2c in conjunction with FIG. 3 illustrates a graphical illustration of the operation and a flow chart of the method steps according to an embodiment of the invention for growth of a plant, FIG. 4 graphically illustrates the application of different growth schedules for achieving a specified plant maturing level in different time intervals.
Figure 2B:
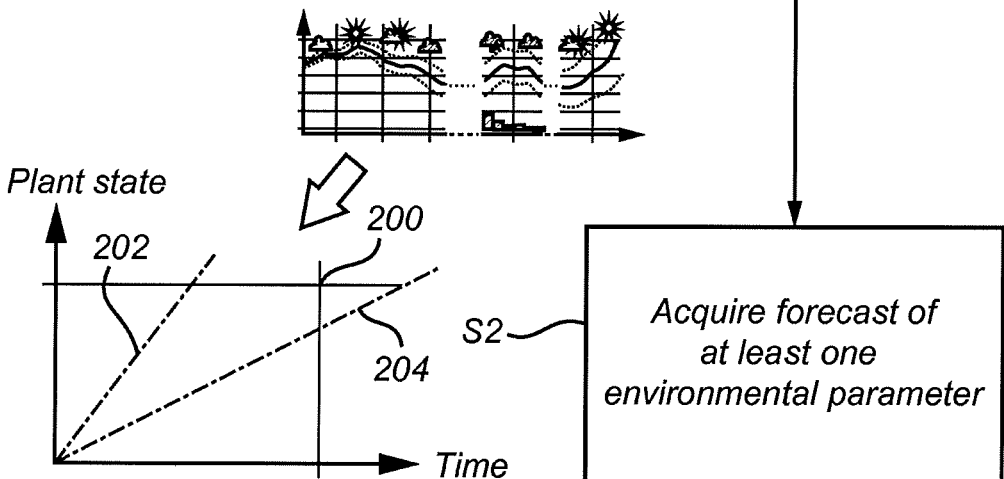
Figures 2C, 3:
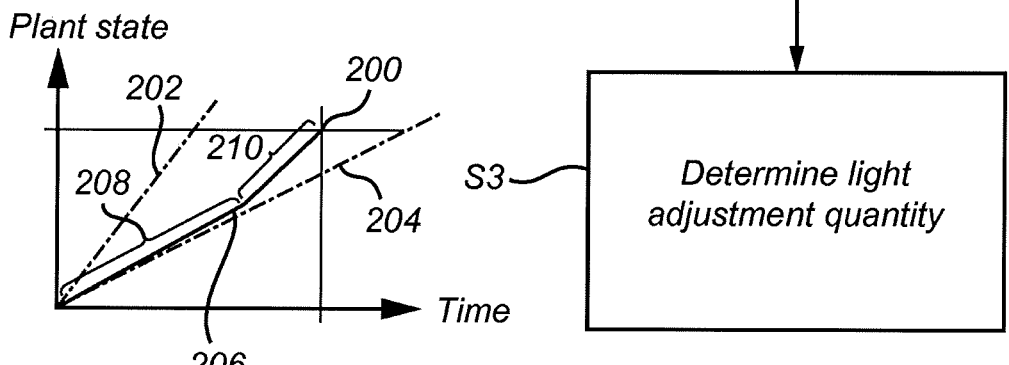

In FIG. 2B, there is further illustrated two "dotted lines" 202, 204 indicating, respectively, the minimum and maximum "boundaries" for growing the specific type of plant to reach a desired "maturing level" at a desired "quality" of the plant. That is, e.g. the minimum boundary 202 indicates the shortest time it may take to grow the specific type of plant to reach the desired maturing level in case an optimal amount of e.g. light, heat, water, fertilizer, etc. is applied to the plant (artificial light/heat possibly in combination with natural light/heat). Similarly, the maximum boundary 204 indicates the maximum time it is possible to "slow down" the growth process (influenced as above by light/heat/etc.) for reaching the desired maturing level at the desired quality. In relation to the above discussion, the minimum boundary 202 may thus define the fast growth regime whereas the maximum boundary 204 may define the slow growth regime. It should be noted that the boundaries 202, 204 have been illustrated as being linear. This is only for an illustrative purpose, as a real life growth process will be further depending on e.g. the current states of the plants. For example, it may in some instances be possible to reduce the growth speed later in the growth process, thus resulting in a non-linear growth of the plant(s).

The process is then continued by determining, S3, a light adjustment quantity as a function of the expected quantity of natural light and a total quantity of light to illuminate the plant 104 during the planned growth period. The total quantity of light will be dependent on the specific type of plant 104 being grown, or if plants of different types are grown in the same greenhouse 102 or greenhouses, a planned growth period relating to the specific mixture of plants being grown in the greenhouse 102.

By determining the light adjustment quantity, and taking into account the forecasted weather conditions (outside of the greenhouse 102), it is possible to schedule the operation of the controllable light absorbent curtains 106 and the controllable artificial lighting arrangements 108. Other factors will of course be taken into account by the control unit 110 when determining the schedule for controlling the light absorbent curtains 106 and the artificial lighting arrangements 108, including for example the above discussed sensors/image capturing devices arranged inside of the greenhouse 102, and/or taking into account the latency for controlling the temperature within the greenhouse 102.

Accordingly, it may be possible to optimize the growth procedure such that plants 104 may be at the desired completion state 200 with a minimized (or at least balanced) cost for growing the plants 104. In the illustration provided in FIG. 2c, the plant 104 is scheduled to grow according to the growth schedule 206, combining a first growth segment 208 and a second growth segment 210. The first growth segment 208 typically includes a minimum amount of added artificial light/heat, using the natural light/heat available within the greenhouse 102 (i.e. being highly economical). However, if the plant 104 was to continue growing according to the first growth segment 208, the desired maturing level of the plant would not be reached at the desired completion state 200, but rather later in time. Accordingly, the system 100 will take the upcoming weather forecast (etc.) into account such that the growth speed for the plant 104 is increased according to the second growth segment 210. Typically and as has been discussed above, the current state of the plant 104 at the time when the transition takes place from the first 208 to the second 210 growth segment will be taken into account such that the desired completion state 200 will be reached at the desired time.

As such, when scheduling the operation of the controllable light absorbent curtains 106 and the controllable artificial lighting arrangements 108 (as well as in relation to heating/venting if the greenhouse 102), it is preferred to also take into account information relating to power grid design, operation and cost of energy consumption (may have impact on cost for operating heating/venting/lighting). For example, in some countries a specific electrical energy tariff may be based on the energy consumption. Different agreements can be made based on fixed price over a time period or a variable price. It may also be possible to agree on a fix fee in relation to the guaranteed peak load. Also, the required peak load from a customer will set requirements on the design of the local power grid as well as the operation of it. Size of transformers, cabling, fuses are design for a certain peak load and the relation between cost and possible peak load is non-linear. Still further, in some countries it is provided a possibility of charging on power rates being variable on an hourly basis which allows for consumers to plan their energy consumption to off-peak hours with lower prices. All of the above or at least some of this information may be used when scheduling the operation of the system 100 according to the invention.

Furthermore, in controlling the growth process of the plants, specifically in relation to optimizing the growth process in relation to a just-in-time concept, it may be possible to make additional considerations, i.e. to be included in the determination of light/temperature control, etc. within the greenhouse 102. Such considerations may for example relate to the actual size of the greenhouse, e.g. relating to the number of plants 104 arranged in the greenhouse 102 as well as the number of persons working within the greenhouse 102. Similar considerations may be made in regards to e.g. a grower/producer operating a plurality of greenhouses, e.g. both relating to energy consumption (total peek consumption for all of the plurality of greenhouses operated by the same grower/producer) as well as in relation to the number of persons servicing (e.g. general operation when growing plants) the plurality of greenhouses.

Still further, also logistical considerations may be taken into account when controlling the growth process within the one of plurality of greenhouses. That is, from a logistical perspective there are generally limitations (trucks, personnel, etc.) in relation to the number of plants that may be transported each and every day. As such, this type of consideration may be taken into account by the system 100 such that the number of plants having reached the desired completion state in some sense matches the capacity of the logistical arrangement used for transporting plants to e.g. the factory/store/etc.

Furthermore, in case different types of plants are grown by the grower, it may be possible to use the knowledge of the growth process for each of the type of plants, such that a desired mixture of different types of plants may be ready for delivery at the same time, thus possibly minimizing transportation to a specific "consumer" (e.g. again being e.g. a factory/store/etc.).

In any case, care is preferably taken to take into account the statistical reliability (if any present) regarding the forecasted weather conditions. As can be seen from FIG. 1, (dotted lines 116), the reliability of the forecast is decreased over time. Accordingly, in some cases it may be necessary to introduce an adjustment of heat/light based on the fact that the forecasted weather conditions are very unreliable, and then introduce a further adjustment at a later point in time as the reliability increases and/or in case the actual weather conditions greatly differ from the forecasted weather. In such a case, the growth process will be focused on have the plants ready at the previously set desired "delivery date". Even though this possibly has introduced an additional use of artificial lighting/heating, the plants will be at the desired completion state at the desired date/time, and as such the possible waste relating to overgrown plants (or plants not being possible to deliver leading to more than one additional transportation of the plants to the end-consumer) is minimized.

Figure 4:
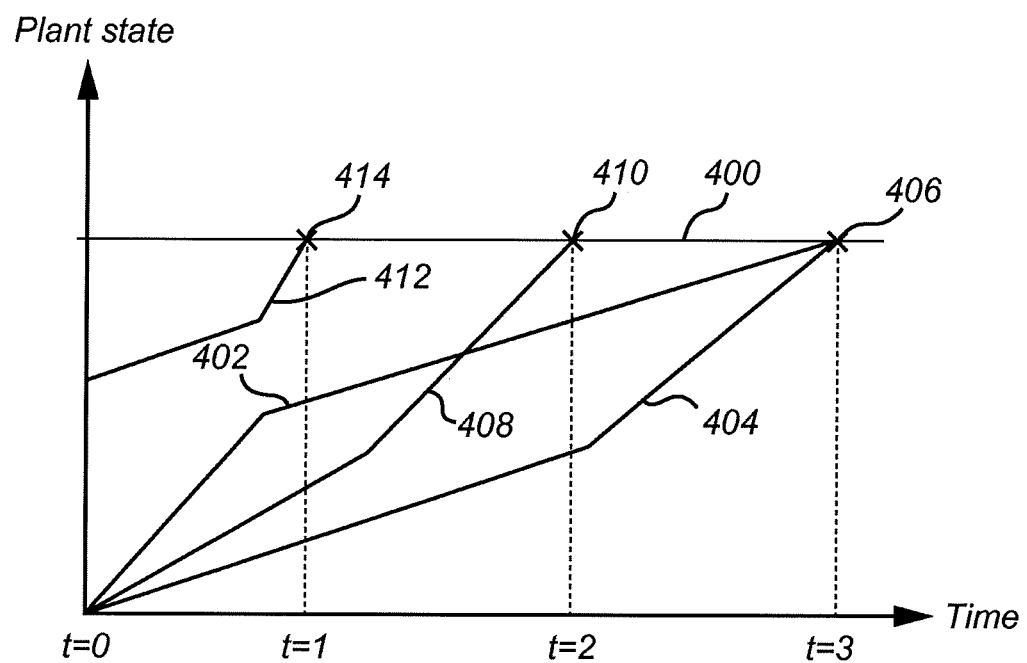

With further reference to FIG. 4, there is provided a graphical illustrates the application of different growth schedules for achieving a specified plant maturing level in different time intervals. In a first example, two different (combined) growth schedules 402, 404 are applied for reaching a desired maturing level (plant state) 406 within a specified duration, in the first example being at the time t=3, where the plants in this first example have been initiated for growth at t=0 (e.g. seedlings, etc.). In this example, the growth schedule 402 applies initially a faster growth speed as compared to the growth schedule 404.

As such, the growth schedule 402 could for example be applied in case where it has been forecasted that only a small amount of natural light/heat is to be expected within a first period, but that it within a second thereafter following period may be expected at least a bit more sun and a higher outside temperature. To be on the safe side and for example taking into account a currently low price of energy (for example as in some countries being available during the weekend), artificial light/heat is applied such that the plants grows up to a specific point before the second time period when the weather is forecasted to change such that the plants may be grown with a minimum amount of artificial light/heat, giving a minimal energy consumption, during the second period and still reaching the desired maturing level (plant state) 406 at t=3.

Similarly, in another scenario of the first example, the other growth schedule 404 is applied for reaching the desired maturing level 406 at t=3. In this scenario the plants will initially in a first period (starting from t=0) have a lower growth speed as compared to the growth schedule 402. In this scenario the system 100 has made a different consideration taking into account the forecasted weather, energy price, available workforce, etc., still reaching the same desired plant state 406 within the desired duration of time.

In a second example, a third growth schedule 408 is applied for growing the plants 104, where the growth of the plants 104 again has been initiated at t=0. In this example, the growth schedule 408 will initially result in a slightly slower growth speed as compared to the first growth schedule 402. However, at a specific point in time, the third growth schedule 408 will allow for a drastic increase in growth speed, such that the third growth schedule 408 in fact allows for the plants to reach a desired maturing level 410 being earlier in time (i.e. at t=2) as compared to the maturing level 406 being at t=3. The drastic change in growth speed for the plants may be due to different reasons, including for example a desire from the end consumer/store/factory to receive the plants 104 at an earlier time, due to changes in available workforce, logistical reasons, available energy, energy prices, etc.

In a third example, a fourth growth schedule 412 is applied for growing the plants 104. In this third example, the plants 104 are illustrated to have had growth imitated at an earlier time (i.e. before t=0 and thus having a somewhat higher plant maturing level at t=0 as compared to the growth initiation point of first and second example (i.e. being t=0). As can be seen, the growth schedule 412 is in a similar manner as discussed above subdivided into two periods, initially in the first period having a lower growth speed, and then later on in the second period switching to a growth regime providing a higher growth speed.

Accordingly, the systematized manner according to the invention makes it possible to plan the "completion dates" (e.g. 414, 410 and 406 being at t=1, t=2, t=3, respectively) to be spaced apart in time, thus allowing e.g. work-force planning, logistical implications (as discussed above) as well as a peak energy consumption for the greenhouse(s) 102 to be optimized.

Specifically, from FIG. 4 it will in regards to the fourth growth schedule 412 be apparent that the point in time when the growth speed is switched to a higher growth speed is at essentially the same time as when growth schedule 402 switches from a higher growth speed to a lower growth speed. Such a scenario may be useful when taking into account a maximum energy consumption for providing artificial light and heat to the greenhouse 102. That is, in case both the growth schedules 402 and 412 includes the consumption of a fair amount of electrical energy (such as in relation to artificial light/heat), allowing only one of the growth schedules to apply a "faster growth speed" (i.e. the other one of the growth schedules 402/412 being at an, in comparison "lower growth speed") would reduce any electrical energy consumption peaks. This would possibly keep the average consumption at the same level, but the peak level would be lower.

This scenario could be specifically useful in case of a grower having a plurality of greenhouses connected to the same electrical grid. In an example with ten greenhouses, the inventive system could for example determine that it would be suitable to activate electrical heaters and input 10 kW/h into each of the ten greenhouses (the heaters in each of the greenhouses having a momentary consumption of 10 kW). If the electrical heaters in each of the greenhouses would be activated at once, the peak energy consumption would be 100 kW. However, in case only five of the greenhouses have activated heaters for the first hour, and the remaining five greenhouses would have heaters activated the second hour, the peak energy consumption would only be 50 kW.

Accordingly, it would within the context of the application be possible to minimize any consumption peaks by careful scheduling of the further application of heat and/or light, thereby possibly lowering also the general overhead expense by enabling a less expensive grid connection with lower power distribution capability (i.e. in relation to the power company supplying the electrical energy).

Figure 5:
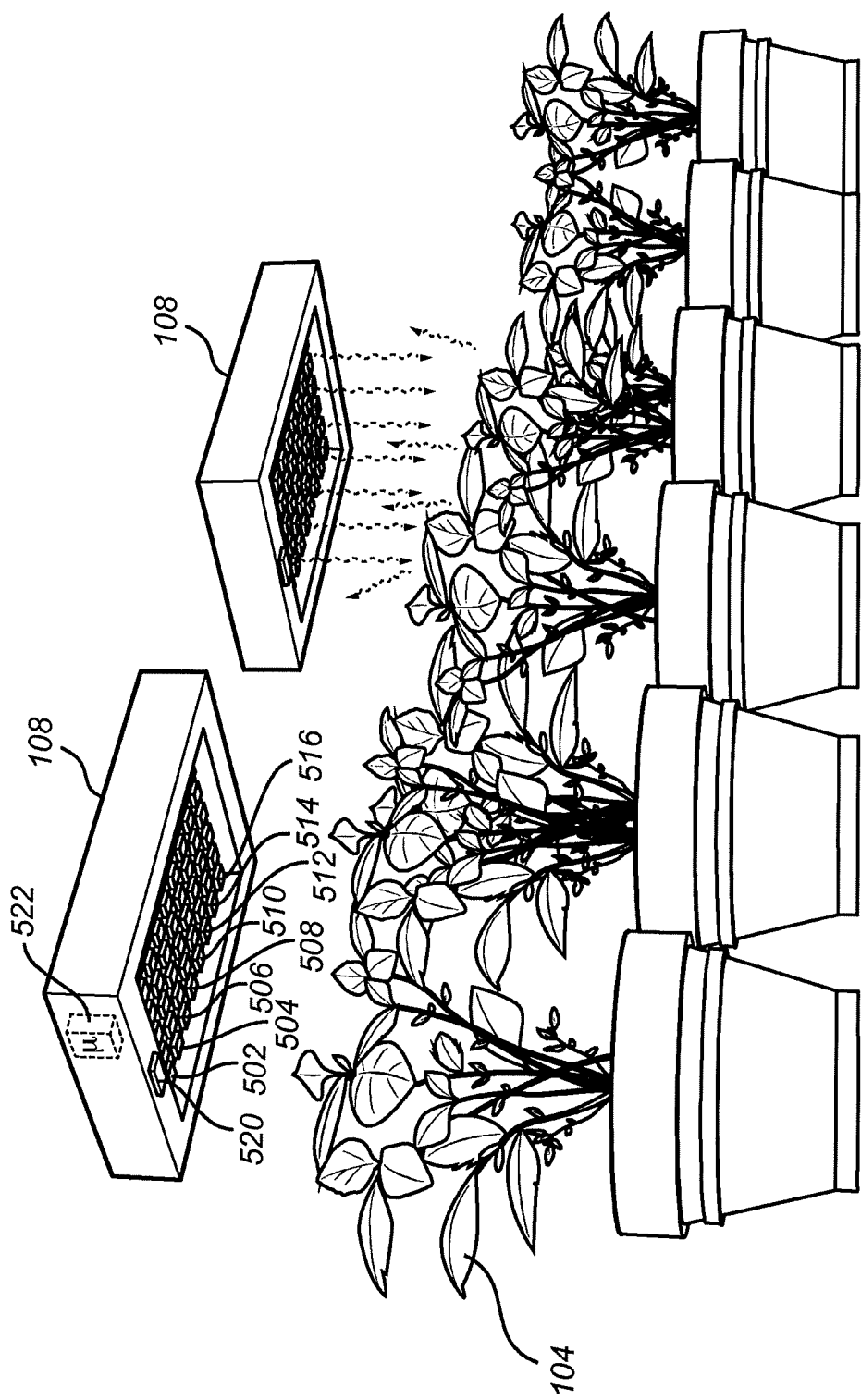
FIG. 5 shows a detailed view of a lighting arrangement used for provides an additional quantity of artificial light used for illuminating a plant.

Finally, with reference to FIG. 5, there is provided a detailed illustration of the artificial lighting arrangement 108 as discussed above. The artificial lighting arrangement 108 comprises at least one light source. In the illustrated embodiment eight differently colored LED based light sources 502, 504, 506, 508, 510, 512, 514, 516 are provided for illuminating a plant 104. The artificial lighting arrangement 108 further comprises a sensor 520 configured to receive light reflected by the plant and control circuitry 522, where the control circuitry 522 is electrically coupled to the sensor 520 as well as to the light sources 502-516.

Preferably, the light sources have different colors (spectra) and typically overlapping spectral distribution (i.e. wavelength ranges overlapping each other and having different peak wavelengths). The different colors of the light sources 502-516 typically range from ultraviolet to far-red. Even though eight light sources 502-516 are illustrated in FIG. 5, more as well as less light sources may be provided within the scope of the invention. Similarly, more light sources of the same color may be provided to achieve desirable power in a specific wavelength range. The sensor 520 selected for receiving the reflected light may for example be a spectrometer, a wavelength adjusted photoresistors (e.g. provided with a color filter), photodiodes, a CCD sensor, or any other type of sensor for receiving the reflected or fluorescent light. As in regards to the light sources, there may be provided a single or a plurality of sensors 520. As such, there may for example be provided one sensor for each of the light sources 502-516, each of the sensors having a wavelength response corresponding to the wavelength range of the light source and incident sun light. The sensors 520 may be used in accordance to the invention for determining that a specific desired light regime is maintained in a combination of incident sun light, artificial light and/or shaded sun light or determining a current growth state for the plant 104, for example by determining a spectral distribution of light reflected from the plant 104. The spectral distribution of light reflected from the plant 104 may accordingly be used by the system 100 for determining a suitable mixture of artificial light to be emitted towards the plant 104 in combination with the incident sun light. The concept of controlling artificial light to be emitted towards a plant 104 based on spectral distribution of light reflected from the plant 104 is further discussed in European patent application EP12185721 by the applicant and hereby fully incorporated by reference.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for controlling the growth of a plant, the plant being of a predetermined type and arranged in a controlled environment subject to receiving illumination of at least natural light, the method comprising:
   acquiring a desired completion state for the plant and a desired completion time defining an end of a planned growth period for the plant;
   acquiring a forecast of at least one environmental parameter outside of the controlled environment, the at least one environmental parameter comprising an expected quantity of natural light to illuminate the plant during at least a portion of the planned growth period,
   determining a light adjustment quantity as a function of the expected quantity of natural light and a total quantity of light required to illuminate the plant during the planned growth period in order to reach desired completion state; and
   based on said light adjustment quantity, scheduling a controllable light absorbent curtain and a controllable artificial lighting arrangement to ensure that the plant reaches the desired completion state at the desired completion time.

2. The method according to claim 1, further comprising:
   determining a distribution schedule over time for the light adjustment quantity to be provided during the planned growth period as a function of the expected quantity of natural light.

3. The method according to claim 2, wherein the determination of the distribution schedule is further based on at least one of a cost of energy for controlling the quantity of light received by the plant, a level of energy consumption for the controlled environment, and a peak energy consumption of the controlled environment.

4. The method according to claim 2, wherein the determination of the distribution schedule is further based a current growth regime applied to the plants growing within the controlled environment.

5. The method according to claim 1, wherein total quantity of light to illuminate the plant during the planned growth period is further determined based on at least one of a growth state of the plant and an environmental parameter inside of the controlled environment.

6. The method according to claim 5, wherein the total quantity of light is re-calculated at least once during the planned growth period.

7. The method according to claim 1, wherein the forecast of at least one environmental parameter outside of the controlled environment further comprises information of an expected temperature fluctuation during at least a portion of the planned growth period.

8. The method according to claim 7, further comprising determining an adjustment schedule of a temperature inside of the controlled environment based on the expected temperature fluctuation during at least a portion of the planned growth period and a desired temperature fluctuation during the planned growth period.

9. The method according to claim 8, wherein the desired temperature fluctuation during the planned growth period is determined based on at least one of a growth state of the plant and an environmental parameter inside of the controlled environment.

10. A computer program product comprising a computer readable medium having stored thereon computer program means for a system for controlling growth of a plant, wherein the computer program product comprises code for performing the steps according to claim 1.

11. A system for controlling the growth of a plant, the plant being of a predetermined type and arranged in a controlled environment subject to receiving illumination of at least natural and artificial light, wherein the system comprises a control unit, a controllable artificial light source, and a light absorbent curtain connected to and being controllable by said control unit, wherein said control unit is configured for:
- acquiring a desired completion state for the plant and a desired completion time defining an end of a planned growth period for the plant;
- acquiring a forecast of at least one environmental parameter outside of the controlled environment, the at least one environmental parameter comprising an expected quantity of natural light to illuminate the plant during at least a portion of the planned growth period,
- determining a light adjustment quantity as a function of the expected quantity of natural light and a total quantity of light to illuminate the plant during the planned growth period, wherein the total quantity of light is determined based on the type of the plant; and
- based on said light adjustment quantity, scheduling the controllable light absorbent curtain and the controllable artificial light source to ensure that the plant reaches the desired completion state at the desired completion time.

12. The system according to claim 11, wherein the control unit is further configured for:
- determining a distribution schedule for the light adjustment quantity to be provided during the planned growth period as a function of the expected quantity of natural light.

13. The system according to claim 11, wherein the forecast of at least one environmental parameter outside of the controlled environment further comprises information of an expected temperature fluctuation during at least a portion of the planned growth period.

14. A computer program product comprising a computer readable medium having stored thereon computer program means for a system comprising a control unit adapted for controlling growth of a plant, the plant being of a predetermined type and arranged in a controlled environment subject to receiving illumination of a mixture of natural and artificial light, wherein the computer program product comprises:
- code for acquiring a desired completion state for the plant and a desired completion time defining an end of a planned growth period for the plant;
- code for acquiring a forecast of at least one environmental parameter outside of the controlled environment, the at least one environmental parameter comprising an expected quantity of natural light to illuminate the plant during at least a portion of the planned growth period,
- code for determining a light adjustment quantity as a function of the expected quantity of natural light and a total quantity of light to illuminate the plant during the planned growth period, wherein the total quantity of light is determined based on the type of the plant; and
- code for scheduling, based on said light adjustment quantity, a controllable light absorbent curtain and a controllable artificial lighting arrangement to ensure that the plant reaches the desired completion state at the desired completion time.

* * * * *